(12) United States Patent
Leps

(10) Patent No.: US 10,463,035 B2
(45) Date of Patent: Nov. 5, 2019

(54) LAMINITIS WEDGE

(71) Applicant: Hermann-Josef Leps, Waltrop (DE)

(72) Inventor: Hermann-Josef Leps, Waltrop (DE)

(*) Notice: Subject to any disclaimer, the term of this patent is extended or adjusted under 35 U.S.C. 154(b) by 93 days.

(21) Appl. No.: 14/781,412

(22) PCT Filed: Mar. 31, 2014

(86) PCT No.: PCT/EP2014/056392
§ 371 (c)(1),
(2) Date: Sep. 30, 2015

(87) PCT Pub. No.: WO2014/161800
PCT Pub. Date: Oct. 9, 2014

(65) Prior Publication Data
US 2016/0021863 A1   Jan. 28, 2016

(30) Foreign Application Priority Data

Apr. 2, 2013   (DE) .................... 20 2013 003 027 U

(51) Int. Cl.
| | | |
|---|---|---|
| *A01L 15/00* | (2006.01) | |
| *A01L 5/00* | (2006.01) | |
| *A01L 7/02* | (2006.01) | |

(52) U.S. Cl.
CPC .............. *A01L 15/00* (2013.01); *A01L 5/00* (2013.01); *A01L 7/02* (2013.01)

(58) Field of Classification Search
CPC .............. A01L 5/00; A01L 7/02; A01L 15/00
USPC .............................. 168/6, 10, 12–14, 26, 28
See application file for complete search history.

(56) References Cited

U.S. PATENT DOCUMENTS

| | | | | |
|---|---|---|---|---|
| 643,246 | A * | 2/1900 | Gale | A01L 7/02 168/28 |
| 903,043 | A * | 11/1908 | Barber | A01L 7/02 168/28 |
| 2,191,834 | A * | 2/1940 | Slack | A01L 7/02 168/28 |

(Continued)

FOREIGN PATENT DOCUMENTS

| | | | | |
|---|---|---|---|---|
| BE | 1019344 A3 | 6/2012 | | |
| DE | 29701859 U1 | 5/1997 | | |
| EP | 2181592 A1 * | 5/2010 | | A01L 7/02 |
| FR | 2434569 A1 * | 3/1980 | | A01L 7/02 |

OTHER PUBLICATIONS

English-language translation of FR 2434569.*
English-language translation of abstract of EP 2181592.*

*Primary Examiner* — Lisa L Tsang
(74) *Attorney, Agent, or Firm* — Brooks Kushman P.C.

(57) ABSTRACT

A hoof soling element to be attached under the hoof of an animal, in particular a horse, wherein said hoof soling element (1) is of uniformly increasing height which enables an area of the soling element (1) that is of lesser height to be attached under the front portion of the hoof and an area of greater height under the rear portion of the hoof, wherein said hoof soling element (1) is composed of a material having a Shore-A hardness ranging between 60 and 90. Said hoof soling is particularly suited for the treatment of laminitis and enables the load acting on the foot to be shifted to the healthy rear hoof portion, wherein as a result of the hardness of the material a sufficient amount of elasticity on the one hand and resistance on the other is achieved.

22 Claims, 4 Drawing Sheets

(56) References Cited

U.S. PATENT DOCUMENTS

| | | | | |
|---|---|---|---|---|
| 3,486,561 A * | 12/1969 | Kulak | A01L 7/02 | 168/4 |
| 4,513,825 A * | 4/1985 | Murphy | A01L 7/02 | 168/12 |
| 4,775,011 A * | 10/1988 | McCuan | A01L 7/02 | 168/12 |
| 4,794,991 A * | 1/1989 | Honderich | A01L 5/00 | 168/26 |
| 5,699,861 A * | 12/1997 | Sigafoos | A01L 3/00 | 168/12 |
| 5,989,695 A * | 11/1999 | Fuller | A01K 1/0157 | 428/175 |
| 6,588,511 B1 * | 7/2003 | Kriesel | A01L 7/02 | 168/14 |
| D479,021 S * | 8/2003 | Kriesel | | 168/26 |
| 6,761,224 B2 * | 7/2004 | McLane | A01L 7/02 | 168/14 |
| 7,762,048 B1 * | 7/2010 | LeCompte | A01K 13/007 | 168/2 |
| 2004/0191446 A1 * | 9/2004 | Kriesel | A01L 7/02 | 428/35.7 |
| 2009/0032269 A1 * | 2/2009 | Ovnicek | A01K 13/007 | 168/24 |
| 2009/0032270 A1 * | 2/2009 | Ruetenik | A01K 13/007 | 168/28 |
| 2012/0279184 A1 * | 11/2012 | Ruetenik | A01K 13/007 | 54/82 |
| 2015/0237840 A1 * | 8/2015 | Lundqvist | A01L 7/02 | 168/28 |

* cited by examiner

LAMINITIS WEDGE

The invention relates to a hoof soling wedge/pad to be attached under the hoof of an animal, in particular a horse, wherein said hoof soling is of uniformly increasing height which enables an area of the soling of the hoof that is of lesser height to be attached under the front portion of the hoof and an area of greater height under the rear portion of the hoof.

Founder (laminitis) is a disease that often affects horses. This is a very painful inflammation of the laminae attaching the hoof wall to the coffin bone. In the process of the disease the hoof wall begins to detach from the laminae. Laminitis in particular occurs in the front toe portion. A distinction is made between acute and chronic laminitis.

Cases of laminitis can be treated by providing relief for the painful affected toe portion. Known hitherto has been the use of wedges glued under the hoof with their pointed end forward so that the load acting on the foot is displaced to the healthy rear hoof portion. For the horse this means a significant alleviation when walking. Up to now wedges of this type have been formed of gypsum or a hard polystyrene material. Also known are hoof shoes having an ascending heel portion.

Disadvantage of the wedges hitherto employed is that they consist of a very hard material which results in the relevant treatment only being poorly tolerated by the animals. Moreover, forming of a suitable hoof soling of gypsum or other self-hardening materials takes a relatively long time during which the horse has to raise the relevant leg under treatment and shift its weight to the other (fore)leg. Due to the fact that laminitis in most cases affects both forelimbs at the same time it is very difficult and extremely painful for the horse to do this.

It is, therefore, the objective of the present invention to provide a hoof soling element that, on the one hand, is more easily tolerated by the horse and moreover can be affixed to the underside of the hoof within the shortest time possible.

According to the invention this objective is reached by providing a hoof soling wedge/pad to be attached under the hoof of an animal, in particular a horse; wherein said hoof soling is of uniformly increasing height which enables an area of the soling of the hoof that is of lesser height to be attached under the front portion of the hoof and an area of greater height under the rear portion of the hoof, and wherein said hoof soling is composed of a material a Shore-A hardness ranging between 60 and 90.

A hoof soling system made up of such a material has turned out to be especially advantageous since, for one thing, it features adequate resistance and at the same time offers sufficient elasticity so that despite the animal's heavy weight it not only offers sufficient durability and is conducive to achieving the purposes of the therapy hut, what is more, is more tolerable by the animal. As a rule, a horse may wear the hoof soling system for a period of approx. 2 to 3 weeks, depending on the temper/character of the horse for up to 4 weeks, before the soling has to be replaced depending on the course of the disease.

Preferably, the hoof soling consists of a composite material composed of rubber granulate and bonding agent. Not only does this material offer sufficient elasticity and resistance it is also, to a certain degree, permeable to water thus allowing moisture that may arise to be discharged to the outside. This enables the formation of putrefaction in the hoof sole to be prevented that may otherwise sometimes occur when gypsum solings are employed.

The hoof soling is usually attached to the underside of the hoof by means of a suitable adhesive tape. This may be accomplished within a very short time. In contrast thereto, a significantly longer time span is needed for the hardening of gypsum or curing synthetic resin materials according to the state of the art which makes the treatment of the animal more difficult. In cases where the removal of the horseshoe proves difficult the hoof soling system may also be attached to the underside of the horseshoe.

Aside from the elasticity of the material used for hoof soling it is also of advantage that the material, to a certain extent, has plastic properties. In this way, the material is capable of partially adapting to the shape of the hoof and can thus meet the needs of the individual animal even better. If necessary, the shape of the hoof soling element may also be adapted prior to or at the time of attachment to the hoof using a sharp and stable tool for this purpose.

Hoof soling in particular serves for but shall not be limited to the prevention and/or treatment of laminitis in horses. For example, if may also be employed for the treatment of tendon injuries and suspensory ligament diseases because hoof soling enables tendons/suspensory ligaments to be relieved. Moreover, said hoof soling method may as well be put to use in the event of other indications calling for an elevation of the hoof heel. Prophylactically, hoof soling may be applied when horses suffer from placental retention and in cases of overfeeding which eventually may otherwise give rise to laminitis. It is to be noted in this context however that hoof soling may also be used for other ungulates.

As already mentioned hereinbefore, the height of the hoof soling element increases from its front portion which is to be affixed to the underside of the toe to the rear portion of the hoof. The hoof soling element thus has a thin front portion and a thicker rear portion. Basically, the forms of the hoof soling element may differ, but in particular the element may have a largely regular wedge shape, that is, the lateral surfaces of the soling element taper at an acute angle toward the font end. However, the top view shows that the soling element has a rectangular shape in this case.

As an alternative, the hoof soling element when viewed from the top may as well be shaped as a horseshoe, with the height of the soling in such a case also increasing from the front to the rear portion when looking at it from the side. Using a hoof soling element in the form of a horseshoe enables the element to be even better fitted to the natural shape of a horse hoof. Horseshoe shape in this context is to be understood such that only the outer contour of the soling element corresponds to the outer contour of a horseshoe whereas the inner area of the horseshoe is also filled with the composite material. Therefore, other than a real horseshoe the soling element in this ease is not merely a narrow, bow-shaped strip of material having an open inner space.

The angle at which the side faces of the hoof soling element taper from the area of greater height to the area of lesser height typically ranges between 5° and 30°, preferably between 10° and 25°, and in particular between 18° and 22°. This applies irrespective of the actual form or shape of the soling element, that is, irrespective of whether it has a rectangular, horseshoe or other form or shape when viewed from the top. As a rule, the thickness of the hoof soling element in the front portion, however, does not decrease to zero so that when viewed from the side an essentially trapezoidal shape is obtained with certain deviations from parallelism of the front and rear side being possible.

It will also be of advantage if the hoof soling element is provided with chamfered edges at least partially which makes the soling more comfortable for the animal to wear, especially inclining the hoof sideways will be easier. The chamfered edges in this case are primarily those that run in the longitudinal direction of the hoof soling element, i.e. the edges that extend from the front to the rear toe area when the soling has been affixed to the hoof of the animal. For this purpose, it may even suffice if only the edges on the upper or lower side are provided with chamfers. In lieu of chamfering the edges they could also be rounded off, and in this case the edges extending in the longitudinal direction of the soling element, in particular on the top and bottom side, are again of significance here. In the event the edges are rounded off such rounding may, for example, have a radius of 10 mm.

As already explained earlier, elasticity is of vital significance for the hoof soling, material and must be within a range that ensures the goal of the therapy can be reached and the horse tolerates the material. The Shore-A hardness is in a range of between 60 and 90, in particularly between 65 and 85.

For the purpose of making the composite material a rubber granulate is mixed with a bonding agent and shaped/formed as necessary. Materials of this type are basically known from prior art especially for the manufacture of running tracks for athletics fields, for children's playgrounds or border strips around swimming pools. The material is hardwearing, weather resistant has a non-slip surface, is unbreakable, and warm to the feet.

Various types of rubber as they are known from prior art can be employed for the production of the rubber granulate. Especially preferred is a styrene butadiene rubber (SBR). Also conceivable, however, is the use of ethylene propylene diene monomer rubber (EPDM). Chloroprene rubber or natural rubber or other types of rubber may also be employed. In its unprocessed condition the rubber granulate has a grain size typically ranging between 1 and 5 mm.

Polyurethane is preferably used as bonding agent. Also suitable for use are other types of adhesive such as acrylates, silicones and the like.

Typically, the bonding agent content of the composite material ranges between 5 and 30% w/w. Preferred is a range of between 15 and 25, in particular of approx. 20% w/w.

As an alternative to the use of the composite material described hereinbefore other materials that have a Shore-A hardness lying within the required range may as well be employed for the hoof soling element. These are as a rule polymers, for example polyurethanes, latex or silicones.

The dimensions of the hoof soling element may vary as required for the relevant animal. The length, i.e. the dimension from front to rear edge, may range between 60 and 140 mm for example. Typically, for instance, are lengths of 70, 90, 110, and 130 mm to suit hooves of different size.

Expediently, the height of the soling element in the rear area may be in the range of between 30 and 70 mm, in particular between 40 and 80 mm. A typical height in the front area ranges between 5 and 15 mm, and in particular is approx. 10 mm.

The width of a typical soling element ranges between 50 and 140 mm.

In the event the edges and in particular the longitudinal edges of the soling element are chamfered the width and height of the such a chamfer typically ranges between 5 and 15 mm.

Aside from the hoof soling element described herein the invention also relates to the use of a material having a Shore-A hardness of between 60 and 90 in the form of a hoof soling element for the prevention and/or treatment of laminitis, tendon injuries or suspensory ligament diseases as well as to an appropriate method for the prevention/treatment. All statements regarding the hoof soling element made hereinbefore with respect to material, form, and properties shall apply in this case as well.

Further elucidation of the invention is provided through the enclosed figures by way of examples, where FIG. 1: is a side or cross-sectional view of a hoof soling element proposed by the invention in which a chamfer is located on the top of the hoof soling element;

FIG. 2: illustrates a rear view of a hoof soling; element in accordance with the invention;

FIG. 3: is a top view of an alternative embodiment of the inventive hoof soling element.

Figure 1:
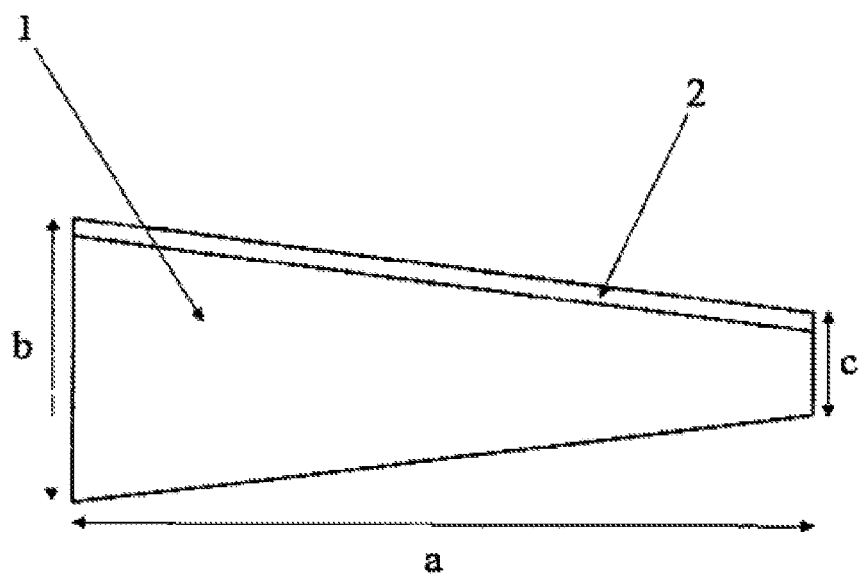
Figure 6:
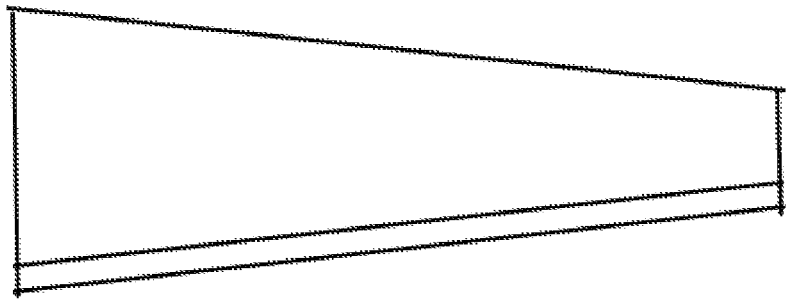
Figure 7:
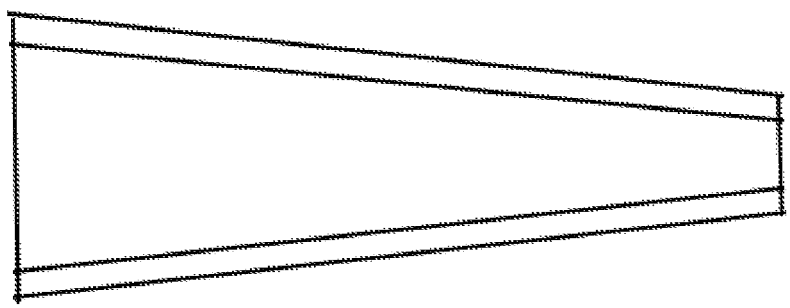

FIG. 6 is another embodiment similar to FIG. 1 but in which a chamfer is located on the bottom of the hoof soling element; and FIG. 7 is another embodiment similar to FIG. 1 but in which a chamfer is located both on the bottom and top of the hoof soling element In FIG. 1 a side view of a hoof soling element 1 is shown as proposed by the invention; The hoof soling element is designed in the form of a wedge, the height of which increasing from front to rear. Moreover, at least some edges are provided with a chamfer 2. To suit the size of the relevant animal and thus the hoof, length a of the hoof soling element for example amounts to 70, 90, 110 or 130 mm, height b in the rear area to 30, 40, 50 or 80 mm, and height c in the front area to approx. 10 mm. Chamfer 2 has a height of between 5 and 15 mm, with chamfer 2 may become narrower in the front area.

Figure 2:
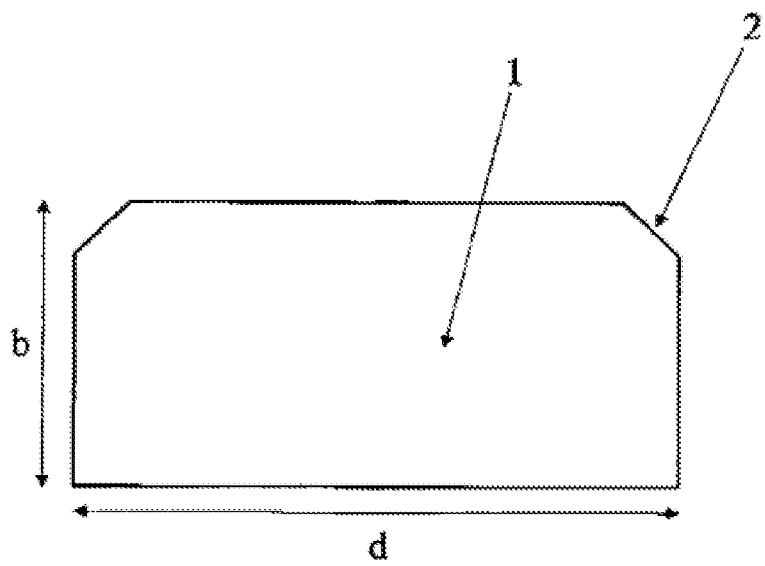

FIG. 2 is a rear view of the hoof soling element 1 shown in FIG. 1. In this Figure chamfer 2 can again be seen having in this case a height of approx. 10 mm and a width of approx. 15 mm. Width d of the hoof soling element, for example, amounts to 70, 90 or 110 mm.

Figure 3:
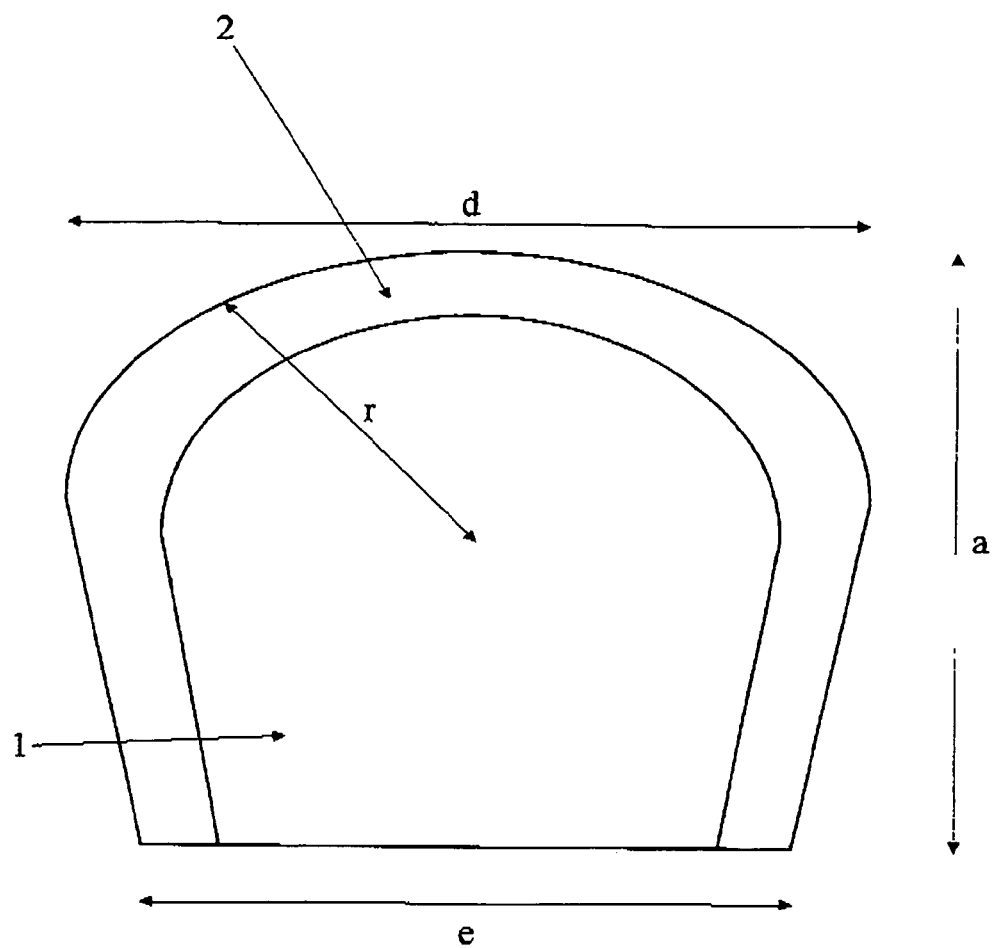
Figure 4:
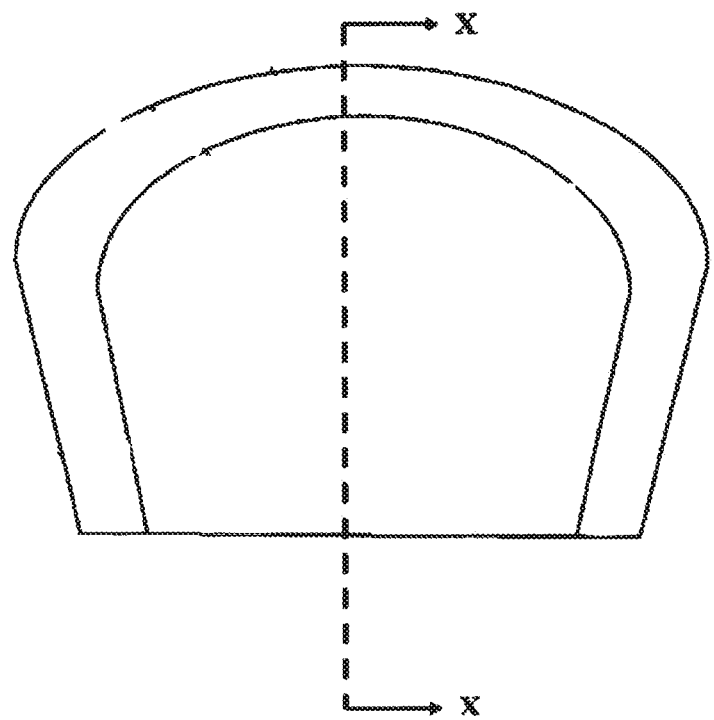
FIG. 4 is another view of FIG. 3 but includes a cross-sectional line along the line X-X.
Figure 5:
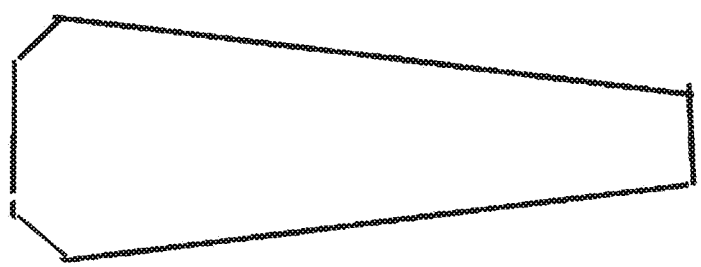
FIG. 5 is a cross-sectional view of the hoof soling element of FIG. 4 taken on line X-X of FIG. 4.

FIG. 3 is a top view of an alternative embodiment of the hoof soling element 1. In this case hoof soling element 1 has the outer contour of a horseshoe, however it is entirely composed of a solid piece of composite material that has been provided at the edges with a chamfer 2 having a width of approx. 15 mm. To suit the size of the relevant animal, length a of the soling element again amounts to 70, 90, 110 or 130 mm, the total width d to 90, 110 or 130 mm, and the width e to 70, 90 or 110 mm. In the rear area. Radius r amounts to 30, 45, 55 or 65 mm.

It is to be clearly understood that the Figures only represent embodiment examples which also means the given dimensions are only typical size indications which may be departed from without leaving the teaching of the invention.

The invention claimed is:

1. A hoof soling element for an animal having a hoof and that serves to prevent and/or treat laminitis, tendon injuries or suspensory ligament diseases, the soling element being composed of an elastic material having a Shore-A hardness ranging between 60 and 90 and having an outer contour and bottom and top sides and front and rear portions shaped to be attached to both the front and rear portions of the animal's hoof under the hoof, wherein the front and rear portions, respectively, have front and rear edges, the soling element having a longitudinal direction extending from the front edge to the rear edge, and wherein the outer contour of the hoof soling element has the shape of a horseshoe when viewed from above, wherein only the outer contour of the hoof soling element has the shape of a horseshoe, a body of the soling element being a solid piece of said elastic material in the form of a wedge extending from said front edge to said rear edge, the soling element being at least partially provided with chamfered edges running longitudinally around an entirety of one or both outer peripheral sides of the hoof soling element, and wherein said hoof soling element is of uniformly increasing thickness throughout the entire hoof soling element, exclusive of the chamfered edges, which enables an area of the soling element that is of lesser thickness to be attached under the front portion of the hoof and an area of greater thickness under the rear portion of the hoof, the chamfered edges extending along the bottom longitudinal side, or both longitudinal sides, of the soling element from its front portion edge to its rear portion edge when the soling has been affixed to the hoof of the animal.

2. The hoof soling element according to claim 1 having a Shore A hardness of between 65 and 85.

3. The hoof soling element according to claim 1, wherein the hoof soling element is composed of a composite material consisting of rubber granules and bonding agent.

4. The hoof soling element according to claim 3, wherein the rubber granules consist of a styrene butadiene rubber.

5. Hoof soling according to claim 3, wherein the rubber granulate consists of an ethylene propylene diene monomer rubber.

6. The hoof soling element according to claim 3, wherein the bonding agent is a polyurethane.

7. The hoof soling element according to claim 3, wherein the composite material has a bonding agent content of between 5 and 30% w/w.

8. The hoof soling element according to claim 3, wherein the composite material has a bonding agent content of between 15 and 25% w/w.

9. Hoof soling according to claim 1, wherein the hoof soling element is composed of a polyurethane, latex or silicone.

10. The hoof soling element according to claim 1, wherein the hoof soling element has side faces that taper from the area of greater thickness to the area of lesser thickness at an angle ranging between 5° and 30°.

11. The hoof soling element according to claim 1, wherein the hoof soling element has side faces that taper from the area of greater thickness to the area of lesser thickness at an angle ranging between 10° and 25°.

12. The hoof soling element according to claim 1, wherein the hoof soling element has side faces that taper from the area of greater thickness to the area of lesser thickness at an angle ranging between 18° and 22°.

13. The hoof soling according to claim 1 wherein the animal is a horse.

14. The hoof soling element according to claim 1, wherein the chamfered edges run in the longitudinal direction on the top side of the hoof soling element.

15. The hoof soling element according to claim 1, wherein the chamfered edges run in the longitudinal direction on the bottom side of the hoof soling element.

16. The hoof soling element according to claim 1, wherein the chamfered edges run in the longitudinal direction on both the bottom and top sides of the hoof soling element.

17. A material having a Shore A hardness ranging between 60 and 90 for use with a method for the prevention and/or treatment of laminitis, tendon injuries or suspensory ligament diseases of hoofed animals, wherein the material is provided in the form of a hoof soling element that has an outer countour and bottom and top sides and front and rear portions shaped to be attached to both the front and rear portions of the animal's hoof under the hoof, wherein the front and rear portions, respectively, have front and rear edges, the soling element having a longitudinal direction extending from the front edge to the rear edge, and wherein outer contour of the hoof soling element has the shape of a horseshoe shape when viewed from above, wherein only the outer contour of the hoof soling element has the shape of a horseshoe, a body of the soling element being a solid piece of said elastic material in the form of a wedge extending from said front edge to said rear edge, the soling element being at least partially provided with chamfered edges running longitudinally around an entirety of one or both outer peripheral sides of the hoof soling element, and wherein said hoof soling element is of uniformly increasing thickness throughout the entire hoof soling element, exclusive of the chamfered edges, which enables an area of the soling element that is of lesser thickness to be attached under the front portion of the hoof and an area of greater thickness under the rear portion of the hoof, the chamfered edges extending along the bottom longitudinal side, or both longitudinal sides, of the soling element from its front portion edge to its rear portion edge when the soling has been affixed to the hoof of the animal.

18. The material to be used in accordance with claim 17, wherein the material is a composite material consisting of rubber granules and bonding agent.

19. The material according to claim 17 wherein the animal is a horse.

20. The material according to claim 17, wherein the chamfered edges run in the longitudinal direction on the top side of the hoof soling element.

21. The material according to claim 17, wherein the chamfered edges run in the longitudinal direction on the bottom side of the hoof soling element.

22. The material according to claim 17, wherein the chamfered edges run in the longitudinal direction on both the bottom and top sides of the hoof soling element.

* * * * *